United States Patent [19]

Akasu

[11] Patent Number: 5,007,397
[45] Date of Patent: Apr. 16, 1991

[54] IGNITION TIMING CONTROL DEVICE
[75] Inventor: Masahira Akasu, Himeji, Japan
[73] Assignee: Mitsubishi Denki K.K., Tokyo, Japan
[21] Appl. No.: 320,128
[22] Filed: Mar. 7, 1989
[30] Foreign Application Priority Data

| Mar. 7, 1988 | [JP] | Japan | 63-54303 |
| Mar. 7, 1988 | [JP] | Japan | 63-54304 |
| Mar. 7, 1988 | [JP] | Japan | 63-54305 |

[51] Int. Cl.$^5$ ............................................. F02P 5/15
[52] U.S. Cl. ................................... 123/422; 123/609
[58] Field of Search .................... 123/609, 422, 423

[56] References Cited

U.S. PATENT DOCUMENTS

| 4,164,706 | 8/1979 | Akita et al. | 123/615 X |
| 4,351,306 | 9/1982 | Luckman et al. | 123/609 |
| 4,366,800 | 1/1983 | Seeger et al. | 123/609 |
| 4,378,778 | 4/1983 | Harter | 123/609 |
| 4,440,141 | 4/1984 | Tsujimura et al. | 123/609 |
| 4,467,776 | 8/1984 | Mezger et al. | 123/609 |
| 4,520,781 | 6/1985 | Nishida | 123/414 |
| 4,538,585 | 9/1985 | Arguello et al. | 123/609 |
| 4,627,398 | 12/1986 | Koike | 123/609 X |
| 4,848,304 | 7/1989 | Iwata | 123/609 |

Primary Examiner—Tony M. Argenbright
Attorney, Agent, or Firm—Sughrue, Mion, Zinn, Macpeak & Seas

[57] ABSTRACT

An ignition timing control device according to the present invention compensates the energizing preparatory time taken until commencement of energizing an ignition coil in reference to the ignition time which alters as the revolution of an engine varies, e.g., during acceleration.

20 Claims, 8 Drawing Sheets

IGNITION TIMING CONTROL DEVICE

BACKGROUND OF THE INVENTION

1. Field of the Invention

The present invention relates to an ignition timing control device for electronic control of the ignition timing in an engine.

2. Description of the Prior Art

FIG. 1 is a block diagram showing the arrangement of a prior art ignition timing control device, in which the numeral 1 is a crank shaft of a four-stroke-cycle four-cylinder engine while 2 is a disk mounted to the crank shaft 1 for revolution about the same. The disk 2 has a couple of magnetic members 3A and 3B fixedly mounted on the circumference thereof and located 180 degrees apart.

There are electromagnetic pickups 4C and 4D provided proximate to the periphery of the disk 2 for generation of reference position pulses Pc and Pd respectively when facing each of the magnetic members 3A and 3B. The electromagnetic pickup 4D is arranged at an angle of 90 degrees to the electromagnetic pickup 4C so that they can produce their respective reference position pulses Pc and Pd alternately upon detecting the magnetic members 3A and 3B while the crank shaft 1 rotates 90 degrees. The angular position of the crank shaft detected by the electromagnetic pickup 4D represents a most delayed ignition timing in the subsequent ignition.

An oscillator 5 produces an output of clock pulse CP. With reference to the clock pulse CP from the oscillator 5, a period measuring means 6 measures a period Tc of the reference position pulse Pc.

On the other hand, an ignition timing computing means 9 computes an ignition timing advance $\theta$ with reference to a reference position of the crank shaft detected by the electromagnetic pickup 4D, according to the information S including the revolutions of the engine and the manifold pressure. Also, an energizing time computing means 20 computes an energizing time Tl, which is required for increasing the primary current of an ignition coil 42 to a specified value, from a battery voltage U.

Then, an ignition preparatory time computing means 10 computes a time Ts, which is taken from the generation of the reference position pulse Pc to the ignition, in a particular manner described later synchronously with the reference position pulse Pc upon receiving the period Tc and the ignition timing advance $\theta$. According to the time Ts and the energizing time Tl of the ignition coil 42, an energizing start time computing means 21 computes a time Toff taken for energizing the ignition coil 42 after the generation of the reference position pulse Pc. Upon receiving the clock pulse CP, reference position pulse Pc, and energizing start time Toff, an energizing start signal generating means 22 produces an energizing command signal Pon for commencement of energizing the ignition coil 42 when the energizing start time Toff has passed from the generation of the reference position pulse Pc.

According to the time Ts sent from the ignition time computing means 10, the clock pulse CP, and the reference position pulse Pc, a first ignition signal generating means 30 produces an ignition signal Pspk for stopping the current on the ignition coil 42 when the time Ts has passed from the input of the reference position pulse Pc. Also, a second ignition signal generating means 31 produces a second ignition signal Psd as synchronizing with the input of the reference position pulse Pd.

Then, an ignition control signal generator means 40 converts the output to an ignition means 41 from "L" level to "H" level synchronously with the energizing command signal Pon and also, outputs an ignition control signal Ps which converts the output to the ignition means 41 from "H" level to "L" level in synchronization with whichever of the first and second ignition signals Pspk, Psd comes earlier. Consequently, the ignition means 41 is actuated by the ignition control signal Ps thus to activate the ignition coil 42 for ignition in the engine.

FIG. 2 is a time chart showing the timing of signal outputs from the components of the prior art ignition timing control device. As a series of the reference position pulses Pc sent from the electromagnetic pickup 4C are designated as Pc1, Pc2, and Pc3 (FIG. 2-*a*), a pulse period Tc2 between Pc1 and Pc2 can be measured by the period measuring means 6 upon input of the reference position pulse Pc2 and with reference to the clock pulse CP from the oscillator 5.

When the reference position pulse Pcs is output, the ignition time computing means 10 computes the time Ts taken for the next ignition (FIG. 2-*c*), as referring to the pulse period Tc and the ignition timing advance $\theta$, from:

$$Ts = \frac{90 - \theta}{180} \times Tc \quad (1)$$

An ignition signal Pspk2 for instruction of current cut-off on the ignition coil 42 is then generated by the first ignition signal generating means 30 in the manner described previously, when the resultant time Ts2 determined by the equation (1) has passed from the generation of the reference position pulse Pc2. Accordingly, the energizing start time computing means 21 can compute the time Toff which is taken for energizing the ignition coil 42 after the generation of the reference position pulse Pc2 within a corresponding ignition period to the ignition.

More specifically, the energizing start preparatory time Toff is determined by subtracting the energizing time Tl given by the energizing time computing means 20 from the time Ts given by the ignition timing computing means 10 for ignition after the input of the reference position pulse Pc. Then, the equation is:

$$Toff = Ts - Tl \quad (2)$$

The energizing command generating means 22 is actuated upon generation of the reference position pulse Pc in order to produce the energizing command signal Pon after the energizing start time Toff has passed (FIG. 2-*d*). The ignition control signal generating means 40 starts energizing the ignition coil 42 on receiving the energizing command signal Pon. The ignition control signal Ps is then produced (FIG. 2-*f*) upon generation of whichever comes in first of the first ignition signal Pspk and the second ignition signal Psd (FIG. 2-*e*) synchronized with the reference position pulse Pd (FIG. 2-*b*). Accordingly, a current on the ignition coil 42 is cut off and ignition occurs in the engine.

In such an arrangement, the ignition timing control device of FIG. 1 allows the period Tc of the reference position pulse Pc to be uniform during constant revolution in the engine and also, the first ignition signal Pspk to be generated earlier than the second ignition signal Psd. As the result, the ignition is turned on by the first ignition signal Pspk.

FIG. 3 is a time chart showing the timing of signal outputs during acceleration. During the acceleration, the revolution of the engine increases in each action of ignition while the period Tc of the reference position pulse Pc reduces simultaneously. This causes the actual period of the reference position pulse Pc to be shorter than the period Tc used for calculation with the equation (1). As a result, when the ignition lead angle $\theta$ is approximate to zero, the second ignition signal Psd (FIG. 3-e) will be produced earlier than the first ignition signal Pspk (FIG. 3-c). The ignition is thus turned on by the ignition control signal Ps (FIG. 3-f) which is output synchronously with the second ignition signal Psd, or the reference position pulse Pd. Accordingly, the ignition is prevented from occurring after the reference position pulse Pd during the acceleration.

If ignition occurs without the second ignition signal Psd but with the first ignition signal Pspk, a spark is generated with a great delay of time in the ignition of engine during the acceleration as the ignition signal Pspk is given considerably later than the reference position pulse Pd. This may cause a trouble such as a decline in the output of the engine. It will thus be understood that the ignition control with the second ignition signal Psd is an appropriate method for ensuring a responsive action of ignition during the acceleration in the engine.

However, the prior art ignition timing control device utilizes the second ignition signal Psd to avoid an excessive delay of timing in the ignition during acceleration but the timing of allowing the ignition coil 42 to be energized is still the energizing time T1 earlier than the first ignition signal Pspk (FIG. 3-d). Under such a condition that the ignition is turned on by the second ignition signal Psd which comes earlier than the first ignition signal Pspk, after the commencement of energizing by the energizing command signal Pon, an actual energizing period of time (ps2 of FIG. 3-f) will be shorter than the energizing time T1.

For example, as the engine is shifted from idling to racing with a radical change in the rotation, the revolutions of the engine increases in number of engine rotation about 100 rpm per one ignition cycle under the engine speed at about 1000 rpm. The energizing time will thus be least in length on the prior art ignition timing control device when the ignition lead angle $\theta$ is zero. In the above-described racing condition, the time Ts taken until ignition at 1000 rpm (Tc=15 ms) is then represented by Ts=15 (ms) from the equation (1). When the revolutions of engine increases constantly in steps of 100 rpm per an ignition cycle, the time Tcd from the generation of the reference position pulse Pc to the ignition signal Psd will be 14.3 (ms). Thus, a deficiency in the energizing time is 0.7 (ms) calculated from Tcd−Ts≈ −0.7 (ms).

If the ignition lead angle $\theta$ is 2°, the ignition time Ts is 14.7 (ms). This causes the energizing time to be less 0.3 (ms) in length.

Particularly, for use in an up-to-date engine designed to run at a high speed of revolution, e.g. a DOHC engine, an ignition coil in which the primary current can be built up quickly for having a specified rate of secondary output in a short period of energizing time, is employed to ensure a measure of voltage output at the high speed of revolution. In the ignition coil having the energizing time T1 of 3 (ms), the secondary output voltage will decrease 25% with a small loss of 0.7 (ms) in the energizing time. This may cause misfiring and combustion fault and thus, result in loss of engine power.

Even if the energizing time T1 is precisely computed by the energizing time computing means 20 for having a specified rate of secondary output, it will be shortened during acceleration and lack of energizing time for the ignition coil is inevitable.

SUMMARY OF THE INVENTION

The present invention is directed to solve the above problems.

A first object of the present invention is to prevent an excessive delay in the ignition timing for an ignition coil and also, a short supply of secondary output voltage from the ignition coil caused by a time deficiency in the energizing time for the ignition coil, during running of the engine at an incremental speed of revolution in a state of acceleration.

A second object of the present invention is to compensate the commencement of energizing an ignition coil, with reference to the revolutions of an engine, so as to provide the advancing ignition timing corresponding to an increase in the engine speed, during running of the engine at an incremental speed of revolution in a state of acceleration.

A third object of the present invention is to compensate the commencement of energizing an ignition coil so as to correspond to the ignition timing and the period of engine revolution anticipated in increase of the engine speed, during running of the engine at an incremental speed of revolution in a state of acceleration.

A fourth object of the present invention is to compensate the commencement of energizing an ignition coil only when the ignition timing is advanced to excess as the revolutions of an engine increase, during running of the engine at an incremental speed of revolution in a state of acceleration.

The above and further objects and features of the invention will more fully be apparent from the following detailed description with accompanying drawings.

DESCRIPTION OF THE PREFERRED EMBODIMENTS

Figure 1:
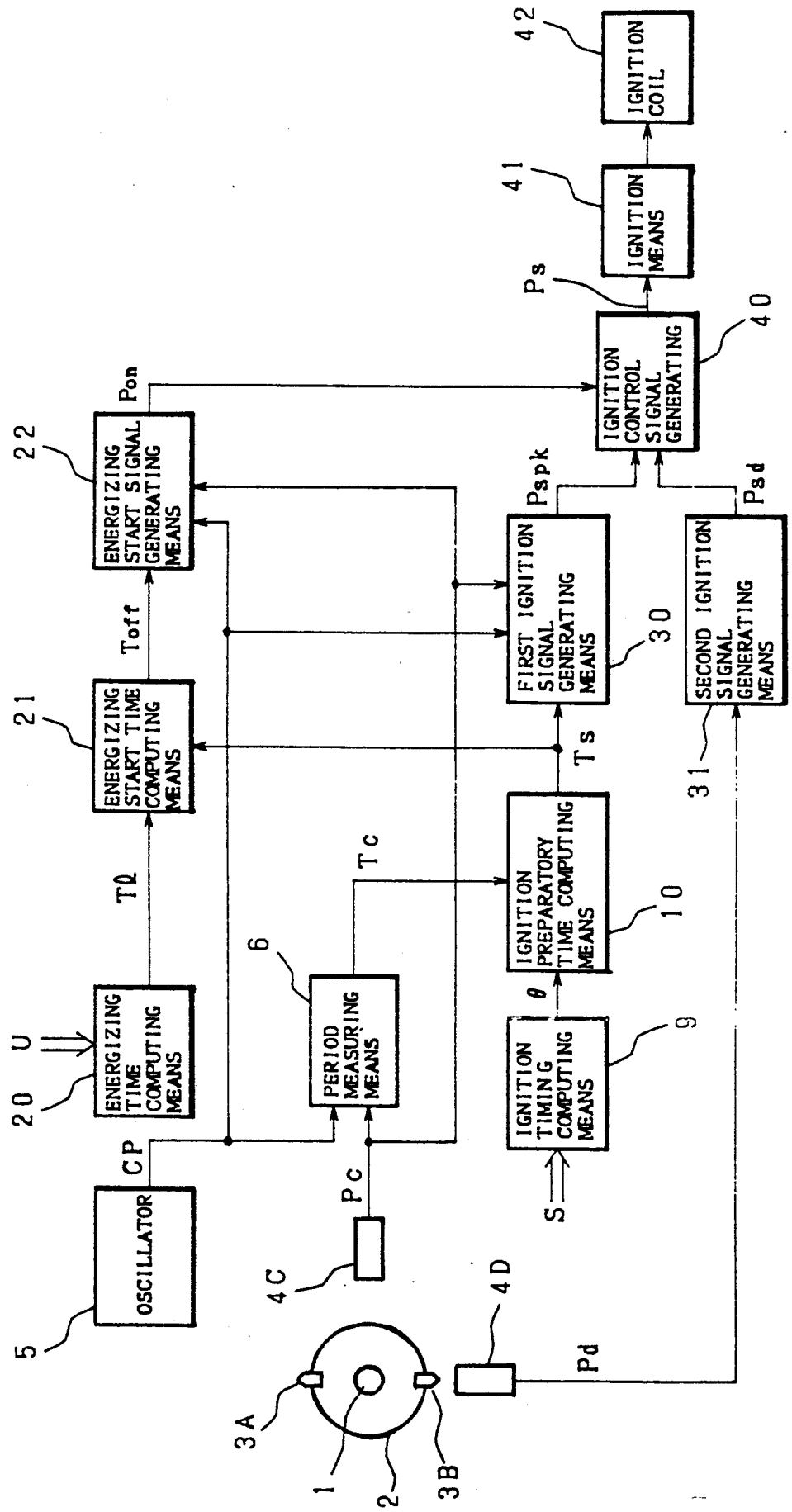
FIG. 1 is a block diagram showing the arrangement of a prior art ignition timing control device.
Figure 4:
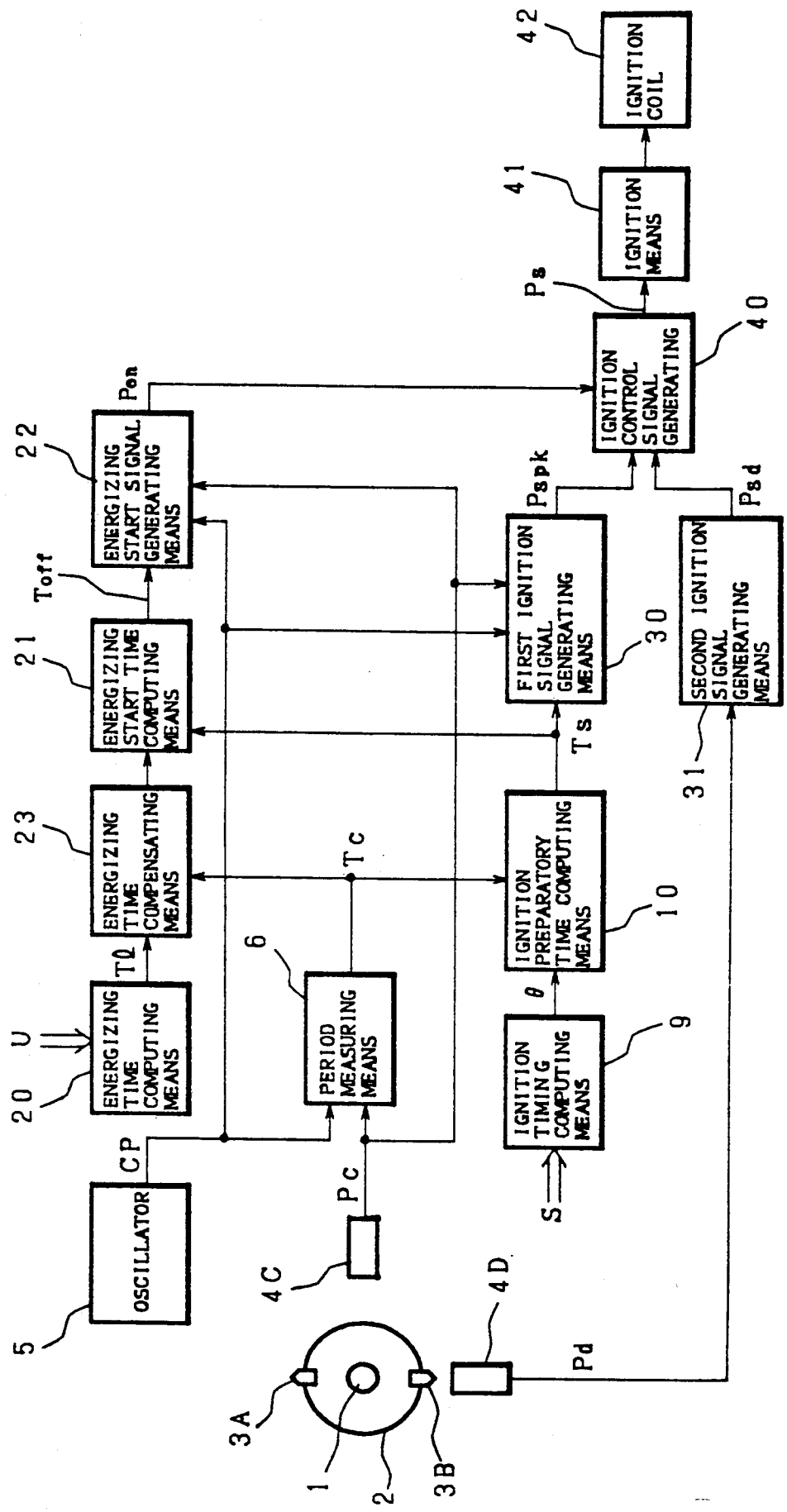
FIGS. 4 and 5 are block diagrams showing the arrangements of ignition timing control devices respectively according to the present invention.
Figure 5:
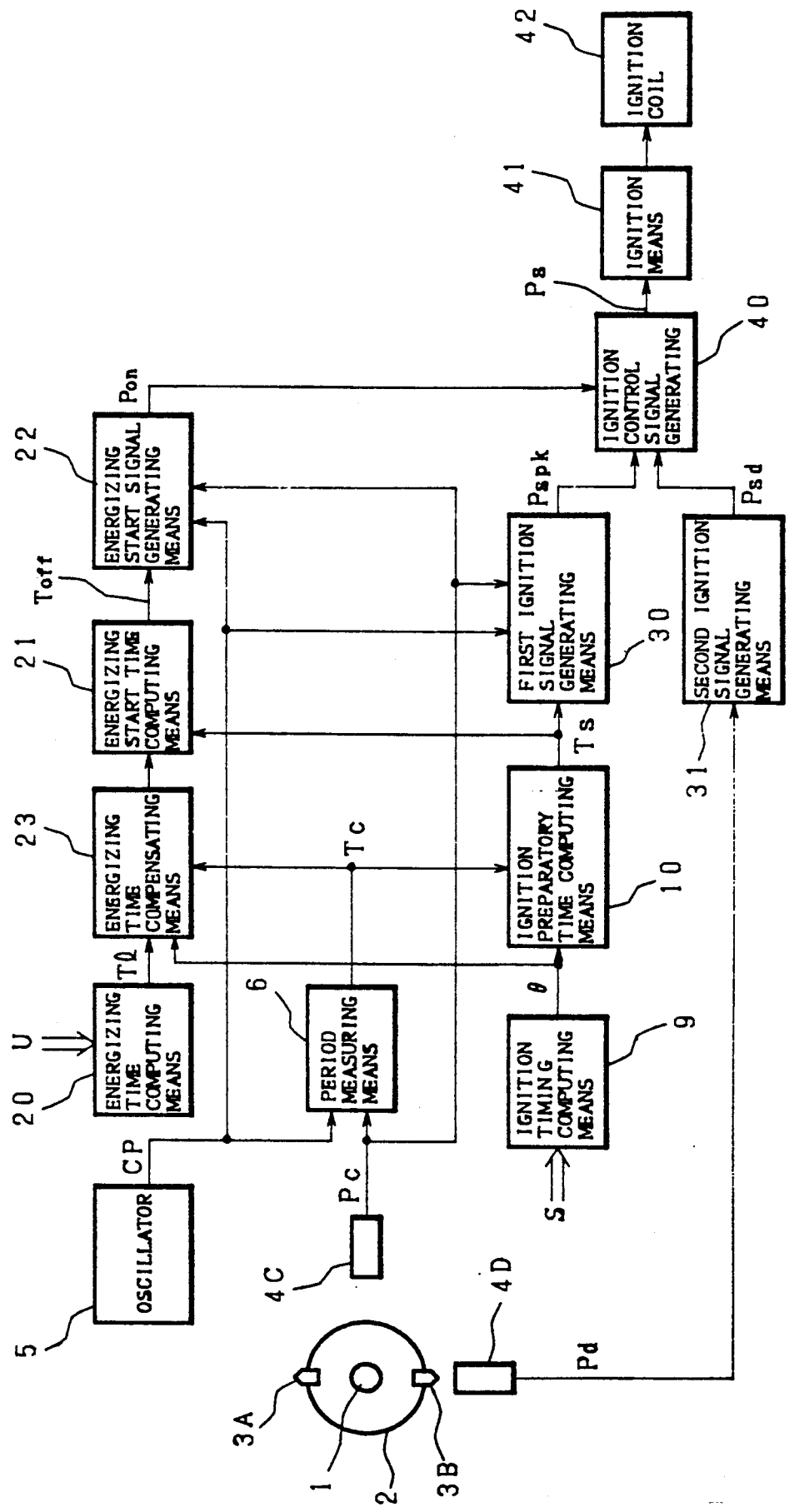

The present invention will be described in detail with reference to the drawings of embodiments. Similar number represents similar component throughout the drawings and thus, the detailed description of similar components will be omitted as having previously been made with reference to FIG. 1. As shown in FIGS. 4 and 5, the numeral 23 is an energizing time compensating means adapted to compensate the reference energizing time Tl for the ignition coil 42 computed by the reference energizing time computing means 20 and determine an energizing time to the ignition coil 42. The compensation $\Delta T$ of energizing time computed in the energizing time compensating means 23 is determined so that the energizing time for ignition coil can correspond to the acceleration in increment of 100 rpm per one ignition cycle. It should properly be set not to increase power consumption on the igniter device and overheat of the ignition coil with excessive compensation and then, will be obtained from the following equation.

Figure 6:
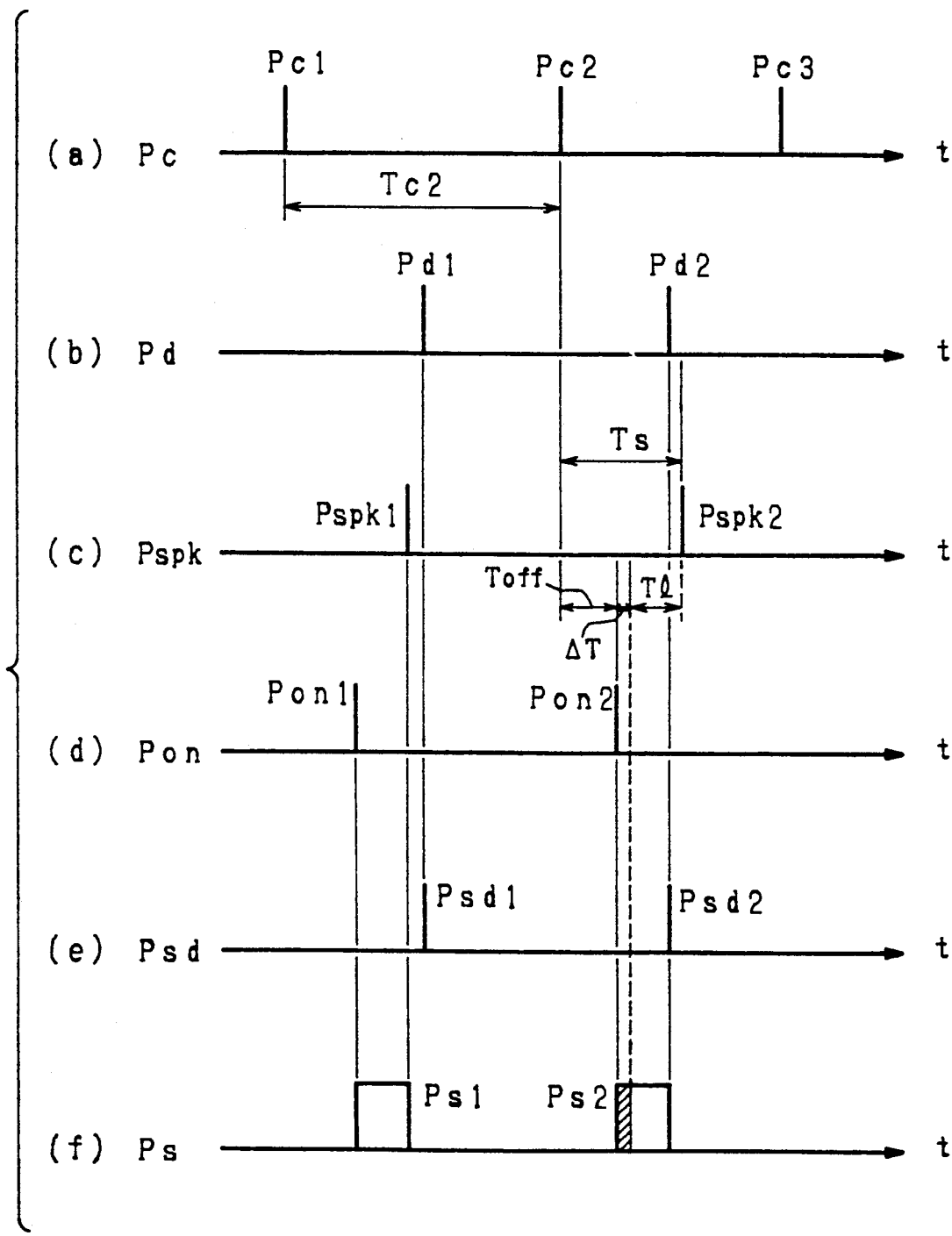
FIGS. 6(a-f) are a time chart showing the timing of signal outputs provided in the ignition timing control device if the present invention during acceleration.

FIG. 6 is a time chart showing the timing of signal outputs from the components during acceleration. Assuming that as the number of engine revolutions is Ne (rpm) determined from the period Tc in setting of an energizing time, it increases to Ne+50 (rpm) at a time of ignition after a 90° turn in the engine, a deficiency of time $\Delta t$ is thus determined to cover the deficiency. When:

$$\Delta t = \left( \frac{60}{Ne} - \frac{60}{Ne + 50} \right) \times \frac{90°}{360°} \quad (3)$$

and $$Ne = \frac{60}{2 \times Tc},$$

$$\Delta t = \frac{5 \times (Tc)^2}{6 + 10 \times Tc}$$

$$\approx \frac{5}{6} \times (Tc)^2$$

Then, $$\Delta T = \frac{5}{6} \times (Tc)^2$$

Figure 7:
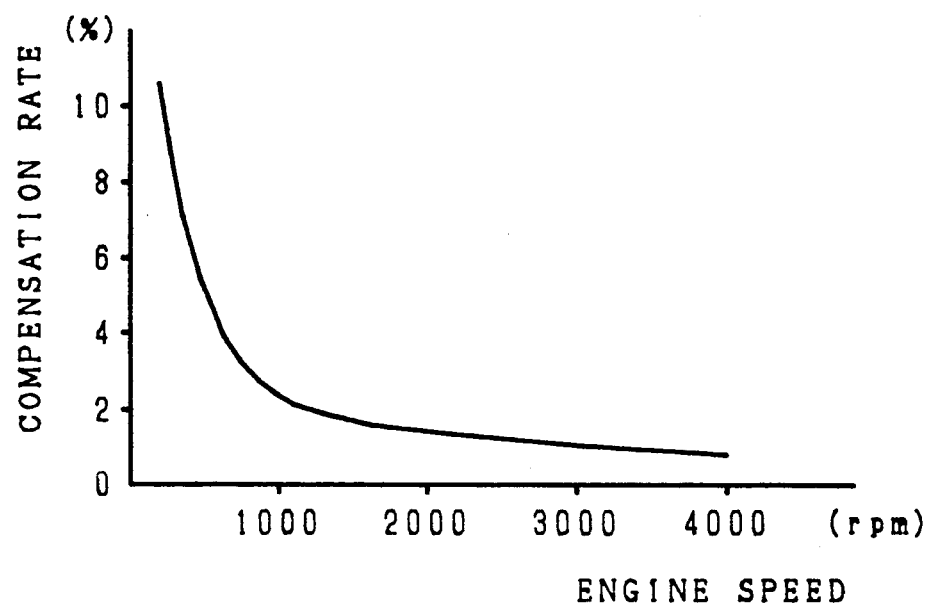
FIGS. 7, 8, and 9 are graphs showing the relations between engine speed and compensating rate of energizing time.

The compensation $\Delta T$ in the energizing time is shown in the form of a rate of time to the one ignition period Tc in FIG. 7. the compensation rate is small at the high speed of revolutions and great at the low speed.

As the reference energizing time Tl is compensated with the compensation $\Delta T$, the actual energizing time is represented by Tl+$\Delta T$.

Accordingly, the time Toff taken until commencement of energizing the ignition coil 42 after the detection of the reference position pulse Pc is obtained from:

$$Toff = Ts - (Tl + \Delta T) \quad (4)$$

As the energizing start time advances $\Delta T$ (FIG. 6-c), a sufficient period of energizing time is given by the ignition control signal Ps even if the ignition is turned on by the signal Psd (FIG. 6-f).

The compensation $\Delta T$ in the energizing time will be 0.7 (ms) from the equation (3) with reference to an increase of 100 rpm per one ignition cycle in the revolution at about 1000 rpm and the energizing time deficiency of 0.7 (ms) can be compensated.

According to the equation (3), a deficiency in the energizing time is compensated through out the revolution of an engine which is thus prevented from running badly with less secondary voltage output.

Although the compensation equation (3) is simple as a formula, practical arithmetic operation with a low-level microcomputer requires a considerable length of processing time and thus, a problem may arise in construction of S/W.

It will be possible to alter the equation (3) into an approximate equation for ease of calculation. For example, provided that the revolution of engine ranges from 500 rpm to 2200 rpm during the acceleration described above, an energizing time deficiency is compensated from:

$$\Delta T = \frac{Tc}{16} - 0.0007 \text{ (sec)} \quad (5)$$

Figure 8:
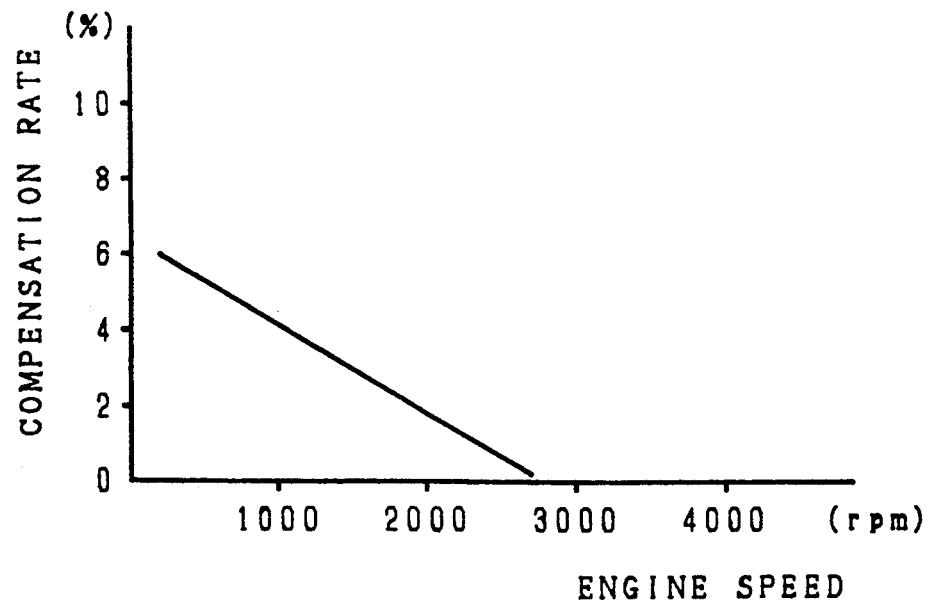

FIG. 8 is a diagram showing the energizing time compensation $\Delta T$ represented by a rate of time to the one ignition cycle Tc. Also, the energizing time for the ignition coil 42 may be determined by compensating the reference energizing time Tl for the ignition coil 42 computed by the reference energizing time computing means 20 in reference to the measurement period Tc from the period measuring means 6 and the ignition lead angle $\theta$ determined by the ignition timing computing means 9.

This embodiment causes the ignition device to increase in power consumption and the ignition coil to overheat due to an excess of energizing time compensation. Hence, the energizing time compensation is determined, for a minimum of need, by:

$$\Delta T = \frac{Tc}{2} \times \left( \frac{5 \times Tc}{3} - \frac{\theta}{90} \right) \quad (6)$$

(where if $\Delta T < 0$, $\Delta T = 0$.)

From the equation (6), the time deficiency $\Delta t$ without energizing time compensation is obtained in which when the revolution of engine is Ne (rpm) calculated from the period Tc in setting of the energizing time, it increases to Ne+50 (rpm) at the generation of the reference position pulse Pd after a 90° turn from the generation of the reference position pulse Pc in the engine in the same manner as described. Then, the compensation $\Delta T$ is determined to compensate the time deficiency.

The ignition time Ts is:

$$Ts = \frac{Tc}{2} \times \frac{90 - \theta}{90} \quad (1)'$$

and the time Tcd between the reference position pulses Pc and Pd is:

$$Tcd = \frac{60}{Ne + 50} \times \frac{90°}{360°} \quad (7)$$

where $$Ne = \frac{60}{2 \times Tc}$$

and more particularly, $$Tcd = \frac{Tc}{2} \times \frac{6}{6 + 5 \times Tc}$$

Then, the time deficiency $\Delta t$ is calculated from:

$$\Delta t = Ts - Tcd \quad (8)$$

Thus, $$\Delta t = \frac{Tc}{2} \times \left( \frac{90 - \theta}{90} - \frac{6}{6 + 5 \times Tc} \right)$$

$$\approx \frac{Tc}{2} \times \left( \frac{5 \times Tc}{3} - \frac{\theta}{90} \right)$$

Figure 9:
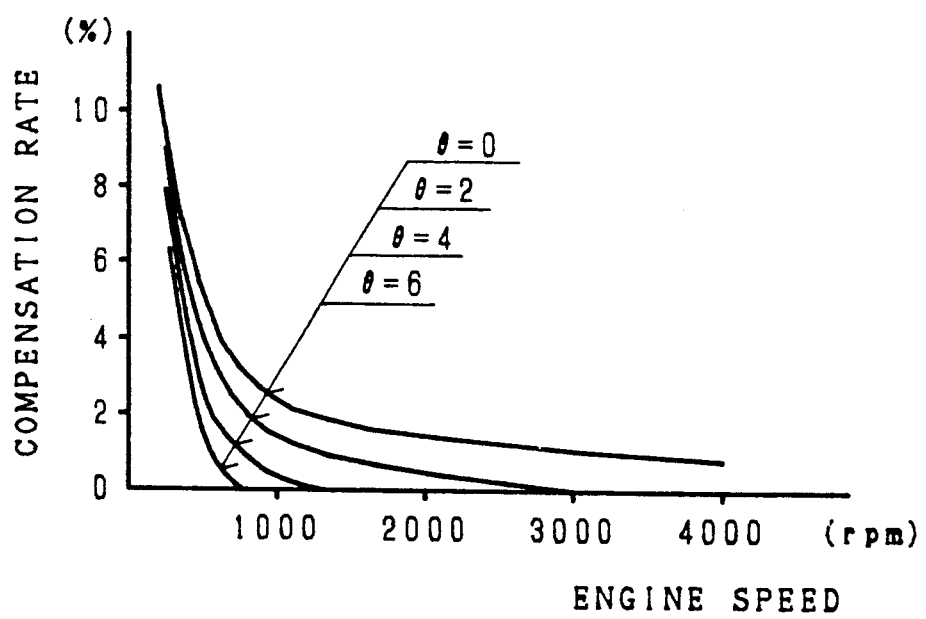

The energizing time compensation $\Delta T$ can be represented by a rate of time to the one ignition cycle Tc, as shown in FIG. 9. In the same manner as in the first embodiment, the rate of compensation is small at the high speed of revolution and great at the low speed. The compensation is also great when the lead angle $\theta$ is approximate to zero. As the lead angle becomes great in advance, the compensation decreases particularly.

The energizing time value is then represented by $Tl + \Delta T$ in compensation of the reference energizing time Tl with the compensation $\Delta T$. The energizing start time for commencement of energizing the ignition coil 42 is designated by the above-described equation (4):

$$Toff = Ts - (Tl + \Delta T) \quad (4)$$

The compensation $\Delta T$ in the energizing time will be 0.7 (ms) from the equation (6) with reference to an increase of 100 rpm per one ignition cycle in the revolution at about 1000 rpm, when the ignition lead angle $\theta$ is 0°. Thus, the energizing time deficiency of 0.7 (ms) can be compensated.

Similarly, the ignition lead angle $\theta$ is 2°, the energizing time compensation $\Delta T$ is 0.4 (ms) and a time deficiency can be compensated.

Accordingly to the equation (6), a deficiency in the energizing time is compensated throughout the revolution of an engine which is thus prevented from running badly with less secondary voltage output. Also, power consumption on the igniter can be minimized as the compensation is set to a minimum in response to the ignition lead angle.

Another embodiment of the present invention will be described referring to a method of compensating the energizing time when required. The engine speed increases in number 100 rpm per one ignition cycle in the same manner as in the previous embodiments.

When the number of engine revolution is Ne (rpm) determined from the period Tc in setting of an energizing time, it increases to Ne + 50 (rpm) at the generation of the reference position pulse Pd after a 90° turn in the engine from the generation of the reference position pulse Pc. Then, the time deficiency for energizing $\Delta T$ is determined as the following so that the commencement of energizing is advanced to compensate the time deficiency.

Particularly, the compensation $\Delta T$ is obtained by subtracting the time Tcd between the reference position pulse Pc and the second ignition signal Psd (i.e. the reference position pulse Pd) from the time Ts between the reference position pulse Pc and the first ignition signal, as set forth above.

$$\Delta T = Ts - Tcd \quad (8)$$

From the equation (7), the time Tcd between the reference position pulses Pc and Pd is:

$$Tcd = \frac{60}{Ne + 50} \times \frac{90°}{360°} \quad (7)'$$

$$\left( \text{wherein } Ne = \frac{60}{2 \times Tc} \right)$$

$$= \frac{Tc}{2} \times \frac{6}{6 + 5 \times Tc}$$

$$\approx \frac{Tc}{2} \times \left( 1 - \frac{5}{6} \times Tc \right)$$

The time deficiency $\Delta T$ is compensated by advancing the energizing time for the ignition coil 42 by $\Delta T$ on a condition that $\Delta T$ is a positive figure. If $\Delta T$ is a negative figure or zero, the energizing start time is obtained from the equation (2) in the same manner as the prior art. Thus, no deficiency in the energizing time for the ignition coil will be generated during the ignition operation.

The range in which $\Delta T$ is a positive figure is, referring to the equations (1), (7)', and (8):

$$\Delta T = \frac{Tc}{2} \times \left( \frac{5 \times Tc}{6} - \frac{\theta}{90} \right) > 0 \quad (9)$$

The condition in which the inequality (9) is satisfied with reference to the ignition lead angle $\theta$ is:

$$0 < 75 \times Tc \quad (10)$$

The energizing start time is computed within a range of ignition timing satisfying the inequality (10) by the energizing start time calculator means 23 and more particularly, obtained from:

$$\begin{aligned} Toff &= Ts - Tl - \Delta T \\ &= Ts - Tl - (Ts - Tcd) \\ &= Tcd - Tl \end{aligned} \quad (4)'$$

Within the ignition timing satisfying the inequality (10), the energizing start time is defined by both the period of engine revolution and the energizing time Tl for the ignition coil 42 while not depending on the ignition period, as apparent from the equation (4)'.

Figure 2:
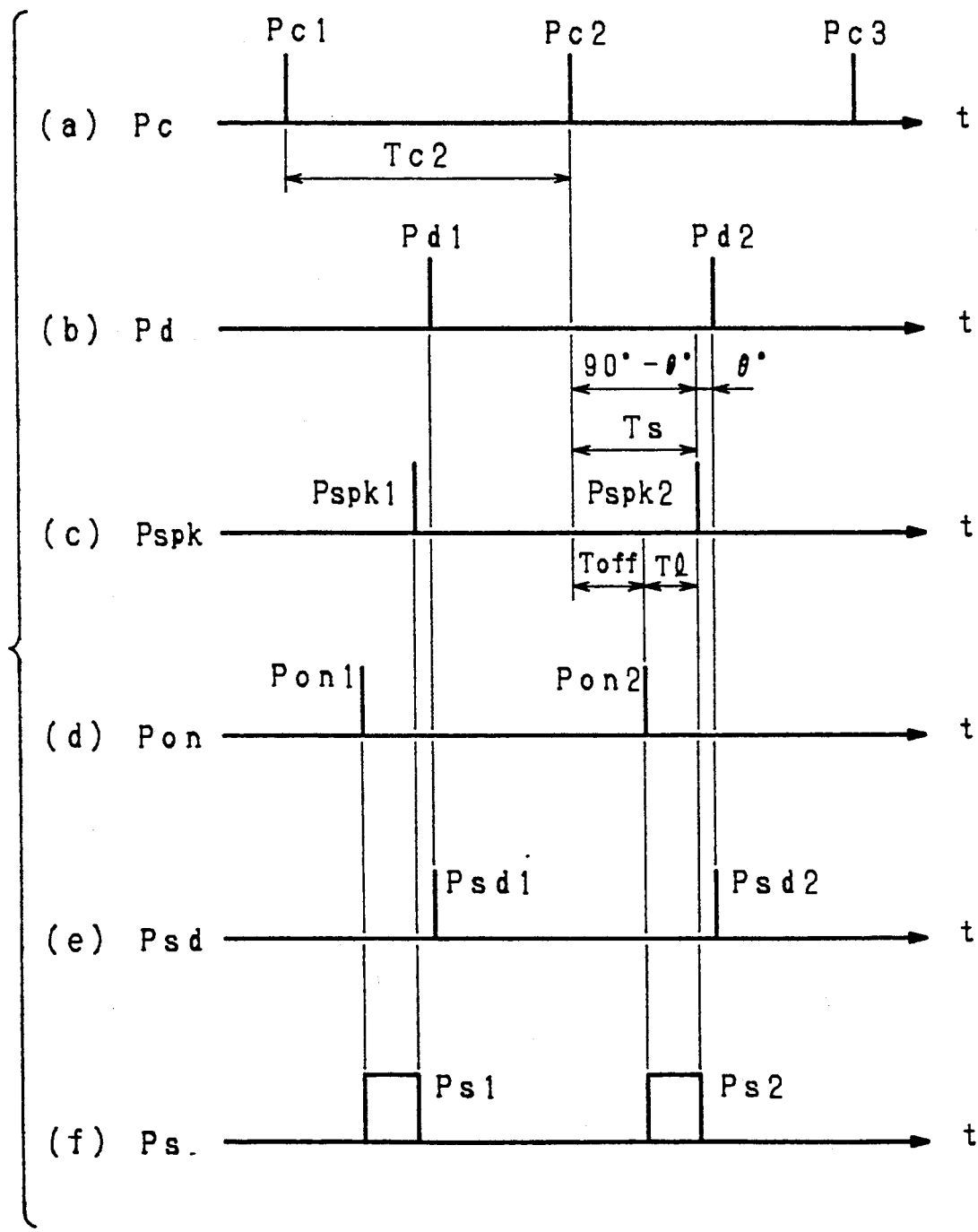
FIGS. 2(a-f) are a time chart showing the timing of signal outputs from the components of the same.
Figure 3:
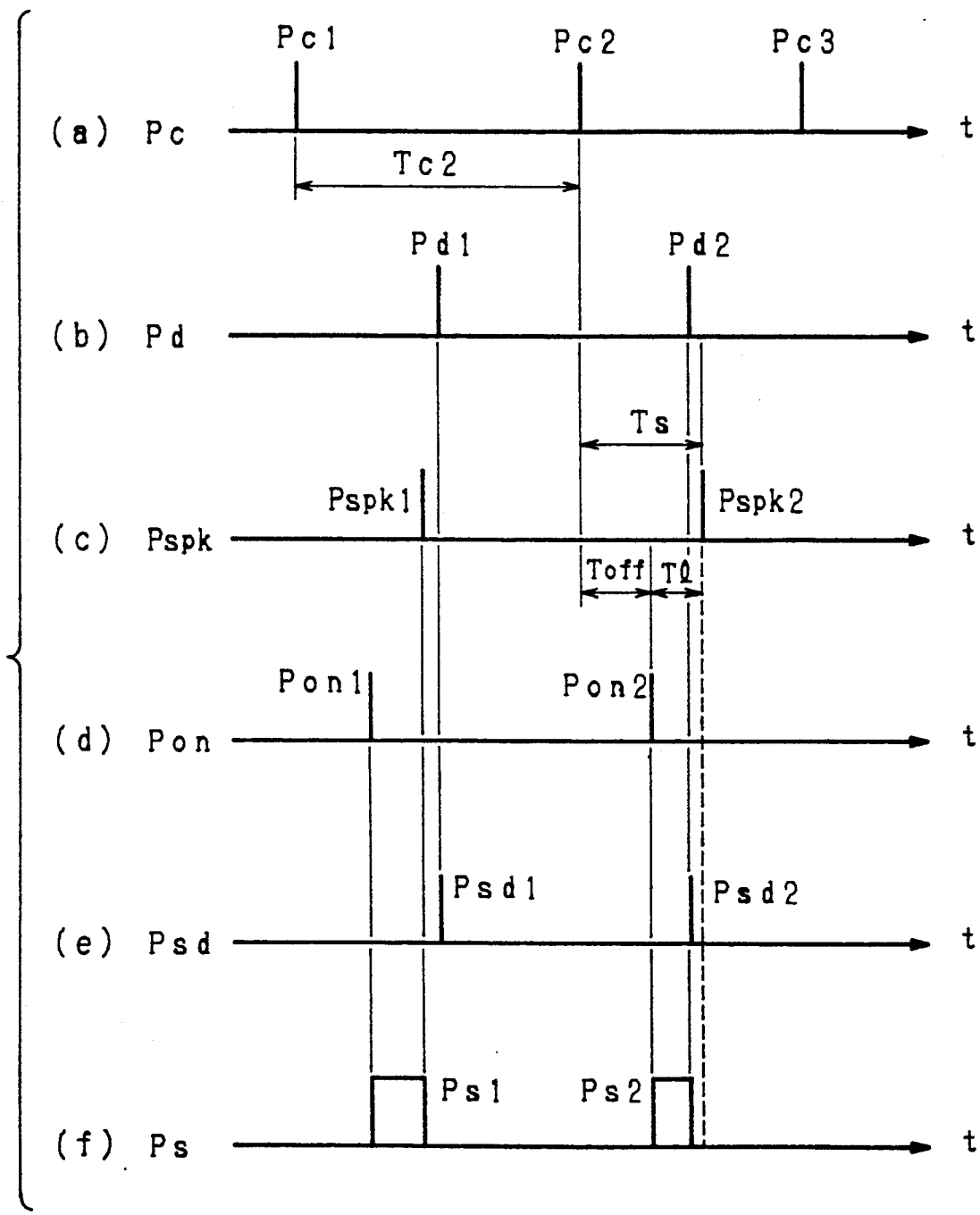
FIGS. 3(a-f) are a time chart showing the timing of signal outputs provided in the prior art ignition timing control device during acceleration.

FIG. 2 illustrates the operation of this embodiment during acceleration. The energizing start time advances $\Delta T$ (FIG. 2-c) thus to ensure a sufficient length of energizing time with the ignition control signal Ps even if the ignition is turned on by the signal Psd (FIG. 2-f).

When the ignition lead angle $\theta$ is zero, due to the advanced energizing start time, the energizing time deficiency $\Delta T$ is 0.7 (ms) from the equation (8) in the condition that the engine speed increases in number of engine rotation 100 rpm per one ignition cycle under the engine speed at about 1000 rpm. However, the energizing is advanced in timing by advancing action as represented by the equation (4)' and as the result, no energizing time deficiency will be created.

During continuous running of the engine at a constant speed of 1000 rpm, the energizing is constantly advanced 0.7 (ms) by the equation (4)' with the ignition timing advance of 0°. It is understood that the increase is too small to affect a common igniter in power consumption.

According to the embodiment, a deficiency in the energizing time is compensated throughout the revolution of an engine which is thus prevented from running badly with less secondary voltage output. Also, the compensation is given to a minimum and thus, power consumption on the igniter can be minimized.

An equation other than the equations described may be obtained for compensating an energizing time deficiency to correspond to the acceleration of engine. The present invention allows changes and modifications of the compensating equations for providing an optimum energizing time to meet any type of the engine having specific characteristics of acceleration. The period of engine revolution used for compensation of an energizing time may be predetermined from the rates of increase and decrease given by measuring a period between two particular rotation angles in the engine.

Although the embodiment employs the two magnetic pickups 4C and 4D for detection of the reference angle position of a crank, an angle detector which changes from low level to high level at the reference position Pc and from high level to low level at the reference position Pd, may be used for detection of the two crank reference positions. It is also possible to detect the two reference positions Pc and Pd with a magnetic pickup in time series and identify them with a detector.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. An ignition timing control device comprising,
   a first position detecting means for detecting the first crank angle position of an engine,
   a second position detecting means for detecting the second crank angle position different in angle from said first crank angle position,
   a revolution period measuring means for measuring the engine revolution period in reference to at least one of said first and second crank angle positions,
   an energizing time computing means for computing an energizing time used to increase the primary current of an ignition coil of said engine to a specified rate,
   an ignition timing computing means for computing the ignition timing corresponding to the current running condition of the engine,
   an ignition stand-by time computing means for computing stand-by time for ignition after detection of the first crank angle position in reference to both said revolution period and said ignition time,
   an energizing preparatory time computing means for computing preparatory time for energizing the ignition coil after detection of the first crank angle position in reference to both said ignition stand-by time and said energizing time for the ignition coil,
   an energizing preparatory time compensating means for estimating the subsequent running condition of the engine and compensating said computed energizing preparatory time according to said estimated subsequent running condition of the engine,
   an energizing start command generating means for producing a command signal for commencement of energizing the ignition coil when the energizing preparatory time from the detection of the first crank angle position has expired,
   first ignition command generating means for producing a command signal for interrupting energizing the ignition coil when the ignition stand-by time from the detection of the first crank angle position has expired,
   second ignition command generating means for producing a command signal for interrupting energizing the ignition coil on detection of the second crank angle position, and
   an ignition control means for starting energizing the ignition coil upon output of the said energizing start command and interrupting energizing the ignition coil according to any one of said first and second ignition commands outputted earlier;
   wherein the energizing preparatory time compensating means compensates the energizing preparatory time in reference to the estimated engine revolution period.

2. An ignition timing control device as set forth in claim 1 wherein said first and second position detecting means comprises two magnetic members disposed in different positions and two electromagnetic pickups disposed in different positions respectively.

3. An ignition timing control device as set forth in claim 1 wherein said first and second position detecting means comprises two magnetic members disposed in different positions and one electromagnetic pickup.

4. An ignition timing control device as set forth in claim 1 wherein said first and second position detecting means comprises an oscillator for signals having distinct output levels at two different detecting positions and an angle detector for identifying the crank angle position upon detecting the output level of said oscillator.

5. An ignition timing control device as set forth in claim 1 wherein the engine revolution period used for compensation of the energizing preparatory time is estimated by increase and decrease in the number of engine revolution measured at different crank angle positions.

6. An ignition timing control device comprising,
   a first position detecting means for detecting the first crank angle position of an engine,
   a second position detecting means for detecting the second crank angle position different in angle from said first crank angle position,
   a revolution period measuring means for measuring the engine revolution period in reference to at least one of said first and second crank angle positions,
   an energizing time computing means for computing an energizing time used to increase the primary current of an ignition coil of said engine to a specified rate,
   an ignition timing computing means for computing the ignition timing corresponding to the current running condition of the engine,
   an ignition stand-by time computing means for computing stand-by time for ignition after detection of the first crank angle position in reference to both said revolution period and said ignition time,
   an energizing preparatory time computing means for computing preparatory time for energizing the ignition coil after detection of the first crank angle position in reference to both said ignition stand-by time and said energizing time for the ignition coil,
   an energizing preparatory time compensating means for estimating the subsequent running condition of the engine and compensating said computed energizing preparatory time according to said estimated subsequent running condition of the engine, an energizing start command generating means for producing a command signal for commencement of energizing the ignition coil when the energizing preparatory time from the detection of the first crank angle position has expired, first ignition command generating means for producing a command signal for interrupting energizing the ignition coil when the ignition stand-by time from the detection of the first crank angle position has expired, second ignition command generating means for producing a command signal for interrupting energizing the ignition coil on detection of the second crank angle position, and an ignition control means for starting energizing the ignition coil upon output of the said energizing start command and interrupting energizing the ignition coil according to any one of said first and second ignition commands outputted earlier;

wherein the energizing preparatory time compensating means compensates the energizing preparatory time in reference to both the estimated engine revolution period and the ignition time computed according to the estimated running condition of the engine.

7. An ignition timing control device as set forth in claim 6 wherein the engine revolution period used for compensation of the energizing preparatory time is estimated by increase and decrease in the number of engine revolution measured at different crank angle positions.

8. An ignition timing control device as set forth in claim 6 wherein said first and second position detecting means comprises two magnetic members disposed in different positions and two electromagnetic pickup disposed in different positions respectively.

9. An ignition timing control device as set forth in claim 6 wherein said first and second position detecting means comprises two magnetic members disposed in different positions and one electromagnetic pickup.

10. An ignition timing control device as set forth in claim 6 wherein said first and second position detecting means comprises an oscillator for signals having distinct output levels at two different detecting positions and an angle detector for identifying the crank angle position upon detecting the output level of said oscillator.

11. An ignition timing control device comprising, a first position detecting means for detecting the first crank angle position of an engine, a second position detecting means for detecting the second crank angle position different in angle from said first crank angle position, a revolution period measuring means for measuring the engine revolution period in reference to at least one of said first and second crank angle positions, an energizing time computing means for computing an energizing time used to increase the primary current of an ignition coil of said engine to a specified rate, an ignition timing computing means for computing the ignition timing corresponding to the current running condition of the engine, an ignition stand-by time computing means for computing stand-by time for ignition after detection of the first crank angle position in reference to both said revolution period and said ignition time, an energizing preparatory time computing means for computing preparatory time for energizing the ignition coil after detection of the first crank angle position in reference to both said ignition stand-by time and said energizing time for the ignition coil, an energizing preparatory time compensating means for estimating the subsequent running condition of the engine and compensating said computed energizing preparatory time according to said estimated subsequent running condition of the engine, an energizing start command generating means for producing a command signal for commencement of energizing the ignition coil when the energizing preparatory time from the detection of the first crank angle position has expired, first ignition command generating means for producing a command signal for interrupting energizing the ignition coil when the ignition stand-by time from the detection of the first crank angle position has expired, second ignition command generating means for producing a command signal for interrupting energizing the ignition coil on detection of the second crank angle position, and an ignition control means for starting energizing the ignition coil upon output of the said energizing start command and interrupting energizing the ignition coil according to any one of said first and second ignition commands outputted earlier;

wherein the energizing preparatory time is compensated in reference to the estimated engine revolution period only when the ignition time computed according to the current running condition of the engine, at the first crank angle position, is earlier than that determined by the engine speed expected at the second crank angle position.

12. An ignition timing control device as set forth in claim 11 wherein the engine revolution period used for compensation of the energizing preparatory time is estimated by increase and decrease in the number of engine revolution measured at different crank angle positions.

13. An ignition timing control device as set forth in claim 11 wherein said first and second position detecting means comprises two magnetic members disposed in different positions and two electromagnetic pickup disposed in different positions respectively.

14. An ignition timing control device as set forth in claim 11 wherein said first and second position detecting means comprises two magnetic members disposed in different positions and one electromagnetic pickup.

15. An ignition timing control device as set forth in claim 11 wherein said first and second position detecting means comprises an oscillator for signals having distinct output levels at two different detecting positions and an angle detector for identifying the crank angle position upon detecting the output level of said oscillator.

16. An ignition timing control device comprising, a first position detecting means for detecting the first crank angle position of an engine, a second position detecting means for detecting the second crank angle position different in angle from said first crank angle position, a revolution period measuring means for measuring the engine revolution period in reference to at least one of said first and second crank angle positions, an energizing time computing means for computing an energizing time used to increase the primary current of an ignition coil of said engine to a specified rate, an ignition timing computing means for computing the ignition timing corresponding to the current running condition of the engine, an ignition stand-by time computing means for computing stand-by time for ignition after detection of the first crank angle position in reference to both said revolution period and said ignition time, an energizing preparatory time computing means for computing preparatory time for energizing the ignition coil after detection of the first crank angle position in reference to both said ignition stand-by time and said energizing time for the ignition coil, an energizing preparatory time compensating means for estimating the subsequent running condition of the engine and compensating said computed energizing preparatory time according to said estimated subsequent running condition of the engine, an energizing start command generating means for producing a command signal for commencement of energizing the ignition coil when the energizing preparatory time from the detection of the first crank angle position has expired, first ignition command generating means for producing a command signal for interrupting energizing the ignition coil when the ignition stand-by time from the detection of the first crank angle position has expired, second ignition command generating means for producing a command signal for interrupting energizing the ignition coil on detection of the second crank angle position, and an ignition control means for starting energizing the ignition coil upon output of the said energizing start command and interrupting energizing the ignition coil according to any one of said first and second ignition commands outputted earlier;

wherein the energizing preparatory time is compensated in reference to both the ignition timing computed according to the estimated running condition of the engine and the engine revolution period at said computing moment only when the ignition time computed at the first crank position according to the current running condition of the engine is earlier than that determined by the estimated engine revolution period at the second crank position.

17. An ignition timing control device as set forth in claim 16 wherein the engine revolution period used for compensation of the energizing preparatory time is estimated by increase and decrease in the number of engine revolution measured at different crank angle positions.

18. An ignition timing control device as set forth in claim 16 wherein said first and second position detecting means comprises two magnetic members disposed in different positions and two electromagnetic pickup disposed in different positions respectively.

19. An ignition timing control device as set forth in claim 16 wherein said first and second position detecting means comprises two magnetic members disposed in different positions and one electromagnetic pickup.

20. An ignition timing control device as set forth in claim 16 wherein said first and second position detecting means comprises an oscillator for signals having distinct output levels at two different detecting positions and an angle detector for identifying the crank angle position upon detecting the output level of said oscillator.

* * * * *